(12) United States Patent
Chung

(10) Patent No.: US 6,582,021 B1
(45) Date of Patent: Jun. 24, 2003

(54) ARMREST WITH OAK VENEER LAYER

(76) Inventor: Pei-Chiang Chung, No. 10, Lane 360, Shin-Hwa 1 Rd., Tan-Tzu Hsiang, Taichung Hsien (TW)

( * ) Notice: Subject to any disclaimer, the term of this patent is extended or adjusted under 35 U.S.C. 154(b) by 0 days.

(21) Appl. No.: 10/222,081

(22) Filed: Aug. 16, 2002

(51) Int. Cl.⁷ .................................................. A47C 7/54
(52) U.S. Cl. ................................ 297/411.2; 297/411.46
(58) Field of Search ........................ 297/411.2, 411.21, 297/411.46, 411.22; 248/345.1; 52/174, 184

(56) References Cited

U.S. PATENT DOCUMENTS

| | | | | |
|---|---|---|---|---|
| 1,094,154 A | * | 4/1914 | Furge | 40/320 |
| 4,089,497 A | * | 5/1978 | Miller et al. | 248/345.1 |
| 4,703,531 A | * | 11/1987 | Bissett | 5/663 |
| 4,710,992 A | * | 12/1987 | Falwell et al. | 5/663 |
| 5,248,186 A | * | 9/1993 | Steinfeld et al. | 297/452.1 |
| 5,271,662 A | * | 12/1993 | Saul | 297/219.1 |
| 5,288,131 A | * | 2/1994 | Singley | 297/452.24 |
| 5,350,217 A | * | 9/1994 | Kanigowski | 297/411.2 |
| 5,496,609 A | * | 3/1996 | Michelstein | 428/71 |
| 5,787,664 A | * | 8/1998 | Hollander et al. | 52/300 |
| 5,924,769 A | * | 7/1999 | Kao | 297/411.44 |
| 6,103,333 A | * | 8/2000 | Keith | 428/99 |
| 6,223,796 B1 | * | 5/2001 | Magee et al. | 152/524 |
| 6,319,585 B1 | * | 11/2001 | Coronado | 428/106 |
| 6,367,878 B1 | * | 4/2002 | Chung | 297/411.2 |

* cited by examiner

Primary Examiner—Peter M. Cuomo
Assistant Examiner—Stephanie Harris
(74) Attorney, Agent, or Firm—Trop, Pruner & Hu, P.C.

(57) ABSTRACT

An armrest includes an armrest body made of a wood material different from oakwood, an upper veneer layer made of oakwood and having a bottom connecting surface covering an upper surface of the armrest body, and two lateral veneer layers, each of which is made of oakwood and has an inner lateral surface covering a respective lateral surface of the armrest body. The ratio of a maximum thickness of the upper veneer layer to the maximum total height of the armrest, which is at least 2¼ inches, is at least 0.1. The ratio of a minimum thickness of each lateral veneer layer to the minimum total width of the armrest, which is at least 1½ inches, is at least 0.1.

5 Claims, 6 Drawing Sheets

ARMREST WITH OAK VENEER LAYER

BACKGROUND OF THE INVENTION

1. Field of the Invention

The invention relates to an armrest, more particularly to an armrest that has upper and lateral surfaces wholly covered by oakwood.

2. Description of the Related Art

Referring to FIG. 1, a conventional armrest, as disclosed in U.S. Pat. No. 6,367,878 B1, is shown to comprise an armrest body 1, a veneer layer 2 covering the upper and lateral surfaces 102, 103 of the armrest body 1, and a pair of elongate decorative ribs 3 connected respectively to the lateral surfaces 103 of the armrest body 1. The armrest body 1 is made of a wood material different from oakwood, such as redwood, cedarwood and rubber wood, and includes a lower surface 101, an upper surface 102, and opposing lateral surfaces 103 that interconnect the lower and upper surfaces 101, 102. Each of the lateral surfaces 103 is formed with a groove 104 that extends in the longitudinal direction. The veneer layer 2 is made of oak wood, and includes an upper veneer portion 201 and a pair of lower veneer portions 202. The upper veneer portion 201 is fixedly attached to the upper surface 102 and curved surface sections of the lateral surfaces 103 of the armrest body 1. The lower veneer portions 202 are fixedly and respectively attached to planar surface sections of the lateral surfaces 103 of the armrest body 1. Each of the decorative ribs 3 is made of oak wood, has a teardrop cross-section, extends in the longitudinal direction, and is fixed in the groove 104 of a respective one of the lateral surfaces 103 of the armrest body 1 by means of an adhesive.

Although the conventional armrest has upper and lateral surfaces 102, 103 wholly covered by oak wood, and can reduce damage to forest resources, during processing of the upper veneer portion 201 of the veneer layer 2, which consists of heating the upper veneer portion 201 so as to make the same soft and bendable, the grain, gloss and pores of the upper veneer portion 201 may be destroyed.

SUMMARY OF THE INVENTION

Therefore, the main object of the present invention is to provide an armrest that is capable of overcoming the aforementioned drawbacks of the prior art.

According to this invention, an armrest having a length, a minimum total width, and a maximum total height comprises an armrest body made of a wood material different from oakwood, an upper veneer layer made of oakwood, and two lateral veneer layers, each of which is made of oakwood. The armrest body extends in a longitudinal direction, and has a planar lower surface, a planar upper surface opposite to the lower surface, and two opposing planar lateral surfaces that interconnect the lower and upper surfaces. The upper veneer layer includes a curved top surface, and a planar bottom connecting surface fixedly attached to and covering the upper surface of the armrest body. The ratio of a maximum thickness of the upper veneer layer to the maximum total height of the armrest is at least 0.1. The maximum total height of the armrest is preferably at least 2¼ inches. Each of the lateral veneer layers includes a planar top end surface fixedly attached to the bottom connecting surface of the upper veneer layer, a bottom end surface opposite to the top end surface, a planar inner lateral surface fixedly attached to and covering a respective one of the lateral surfaces of the armrest body, and a curved outer lateral surface, which is opposite to the inner lateral surface and which is formed with a protruding rib that extends in the longitudinal direction, a planar surface section that extends from the bottom end surface to a lower edge of the rib, and a curved surface section that extends from an upper edge of the rib to the top end surface. The ratio of a minimum thickness of each of the lateral veneer layers to the minimum total width of the armrest is at least 0.1. The minimum total width of the armrest is preferably at least 1½ inches.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
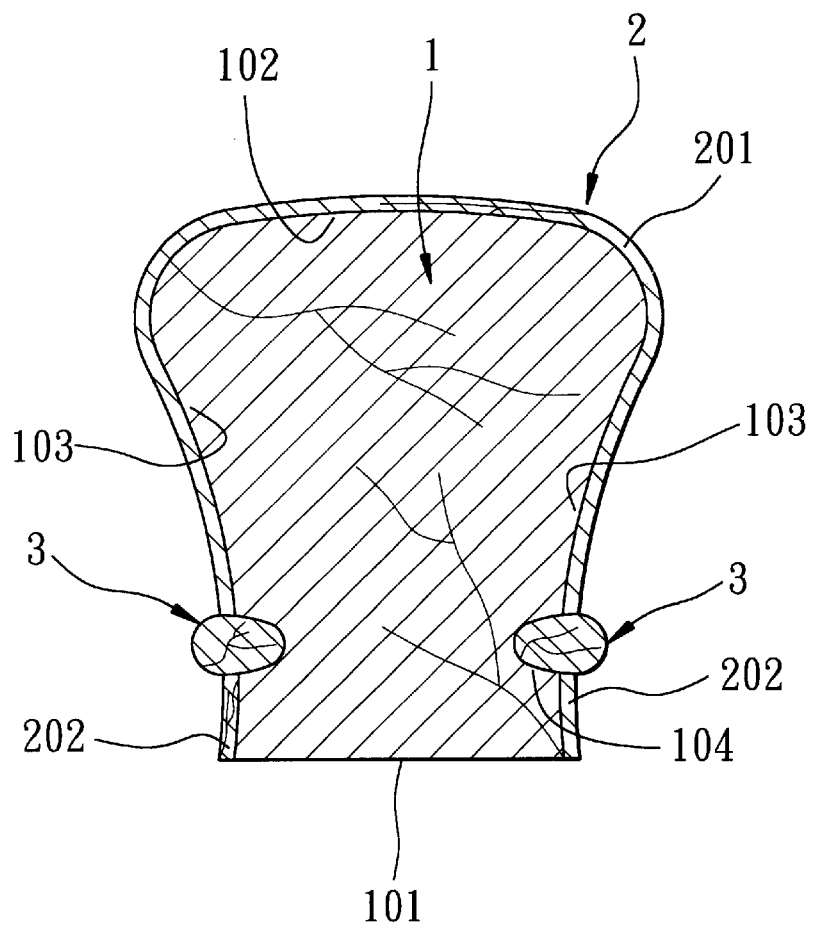
FIG. 1 is a sectional view of a conventional armrest.

Before the present invention is described in greater detail, it should be noted that like elements are denoted by the same reference numerals throughout the disclosure.

Figure 2:
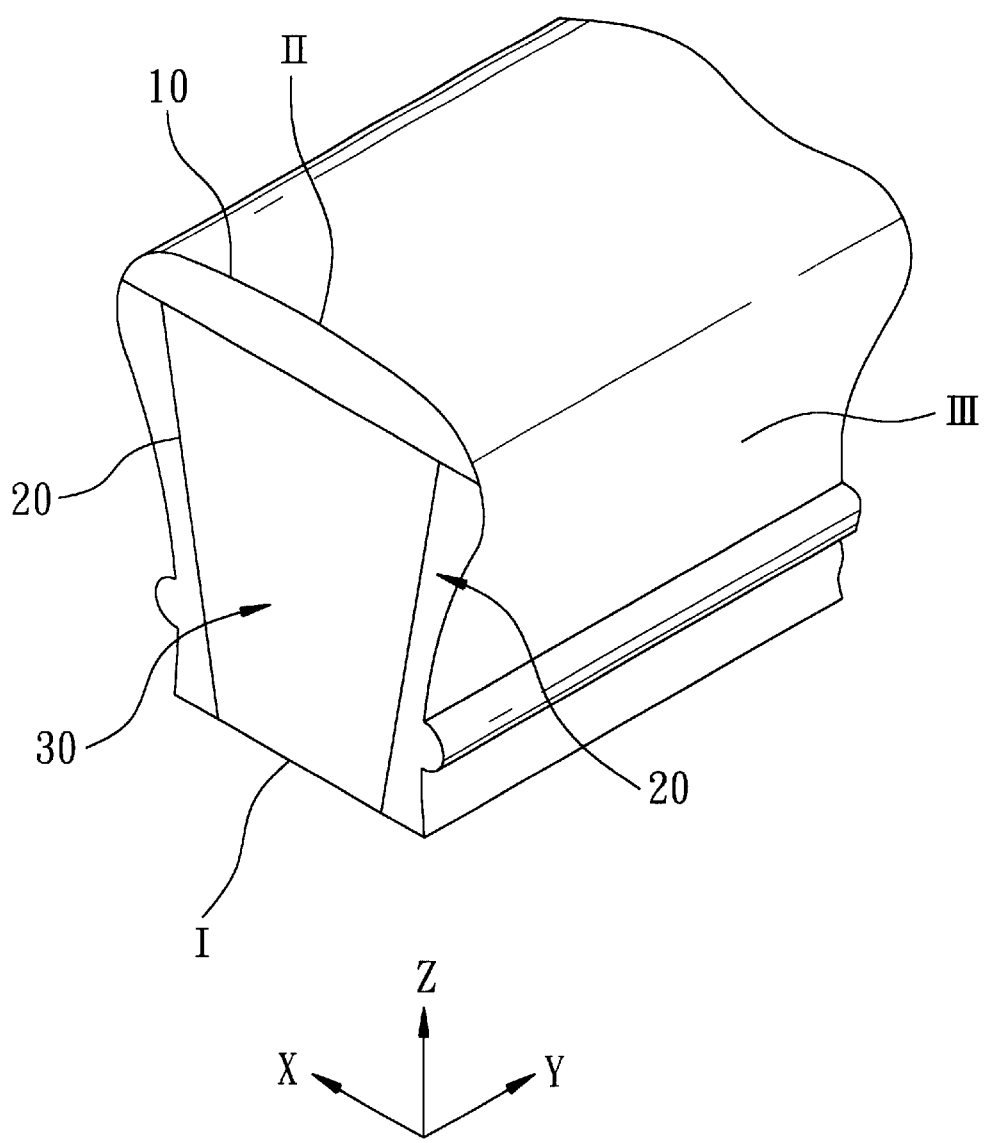
FIG. 2 is a fragmentary perspective view of the first preferred embodiment of an armrest according to the present invention.
Figure 3:
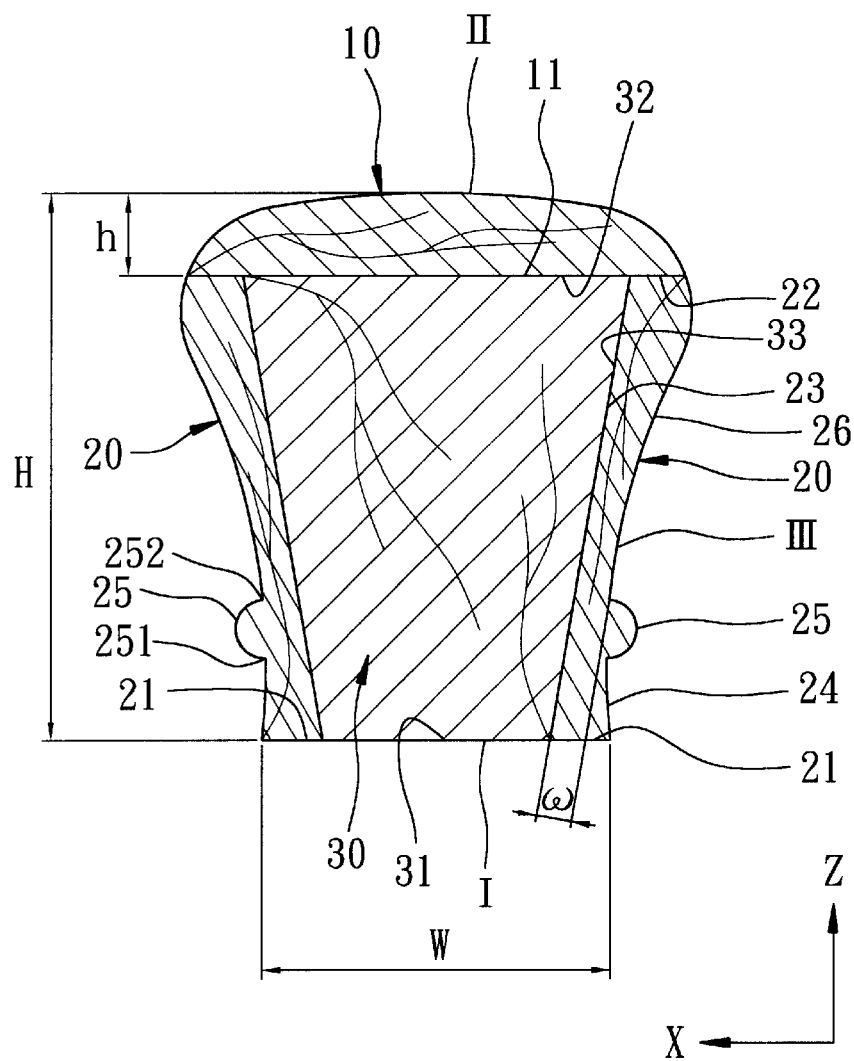
FIG. 3 is a sectional view of the first preferred embodiment.

Referring to FIGS. 2 and 3, the first preferred embodiment of an armrest according to the present invention is shown to have a length, a minimum total width (W), a maximum total height (H), a rectangular bottom surface (I), a curved top surface (II) opposite to the bottom surface (I), and two outer curved lateral surfaces (III) interconnecting the bottom and top surfaces (I, II) and extending along the length of the armrest in a Y-direction. The bottom surface (I) has two short sides extending in an X-direction, and two long sides extending in the Y-direction. The armrest comprises an armrest body 30, an upper veneer layer 10, and two lateral veneer layers 20.

The armrest body 30 is made of a wood material different from oakwood, such as rubber wood and pinewood from plantation forests, defective higher quality wood, and high density fiber material. The armrest body 30 extends in a longitudinal direction, and has a planar lower surface 31, a planar upper surface 32 opposite to the lower surface 31, and two opposing planar lateral surfaces 33 that interconnect the lower and upper surfaces 31, 32. In this embodiment, the upper surface 32 of the armrest body 30 is wider than its lower surface 31.

The upper veneer layer 10 is made of oakwood, has a thickness extending along a Z-direction, and includes the curved top surface (II), and a planar bottom connecting surface 11 connected between lateral sides of the top surface (II) and fixedly attached to and covering the upper surface 32 of the armrest body 30 by means of an adhesive. The ratio of a maximum thickness (h) of the upper veneer layer 10 to the maximum total height (H) of the armrest is at least 0.1.

In this embodiment, the maximum total height (H) of the armrest is at least 2¼ inches.

Each of the lateral veneer layers 20 is made of oakwood, and includes a planar top end surface 22 fixedly attached to the bottom connecting surface 11 of the upper veneer layer 10 by means of an adhesive, a bottom end surface 21 opposite to the top end surface 22, a planar inner lateral surface 23 fixedly attached to and covering a respective one of the lateral surfaces 33 of the armrest body 30, by means of an adhesive, and the curved outer lateral surface (III), which is opposite to the inner lateral surface 23 and which is formed with a protruding rib 25 that extends in the longitudinal direction, a planar surface section 24 that extends from the bottom end surface 21 to a lower edge of the rib 25, and a curved surface section 26 that extends from an upper edge of the rib 25 to the top end surface 22. The ratio of a minimum thickness ($\omega$) of each lateral veneer layer 20 to the minimum total width (W) of the armrest is at least 0.1. In this embodiment, the minimum total width (W) of the armrest is at least 1½ inches.

Figure 4:
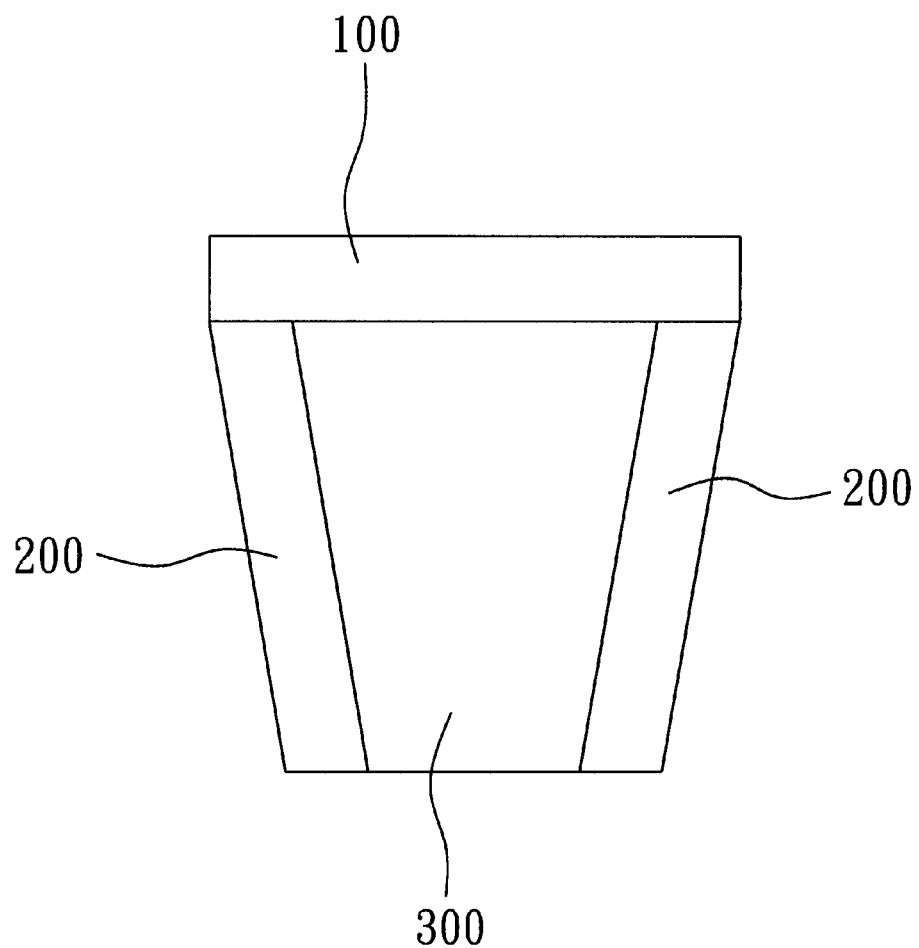
FIG. 4 is a schematic view of a wood material, which can be processed by a lathe to form the first preferred embodiment.

Referring to FIG. 4, a wood material is to be processed by a lathe to form the first preferred embodiment of the armrest of the present invention. The wood material includes a first wood piece 100 for construction of the upper veneer layer 10 (see FIG. 2), two second wood pieces 200 for construction of the two lateral veneer layers 20 (see FIG. 2), and a third wood piece 300 for construction of the armrest body 30 (see FIG. 2).

Referring back to FIG. 3, the armrest according to this invention conveys a higher quality wood appearance in view of the upper and lateral veneer layers 10, 20, which are made of oakwood. Since heating is not necessary prior to adhesion of the upper and lateral veneer layers 10, 20 with the armrest body 30, the outer appearance of the armrest still maintains the original grain, gloss, and pores of the oakwood. Furthermore, since the armrest body 30 is made of a wood material different from oakwood, and since it occupies a larger portion of the wood material for producing the armrest, consumption of higher quality wood material is reduced to a minimum. Thus, damage to forest resources is also reduced.

Figure 5:
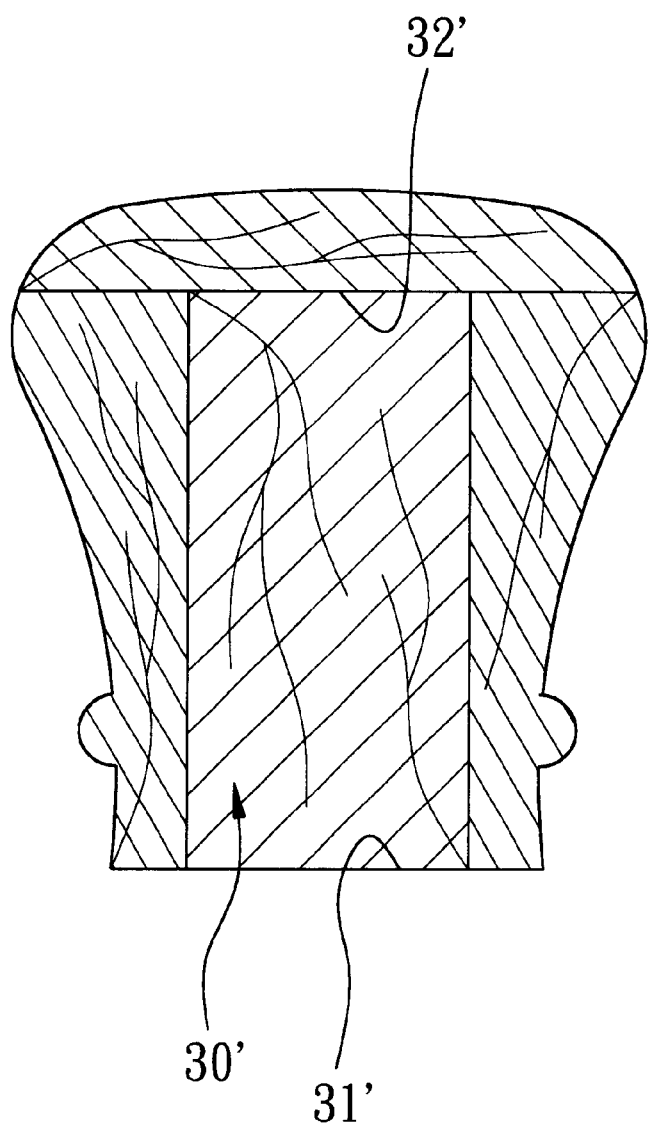
FIG. 5 is a sectional view of the second preferred embodiment of an armrest according to the present invention.

Referring to FIG. 5, the second preferred embodiment of the armrest according to the present invention is shown to be substantially similar to the first preferred embodiment. However, in this embodiment, the width of the upper surface 32' of the armrest body 30' is equal to that of its lower surface 31' such that the armrest body 30' has a rectangular cross-section.

Figure 6:
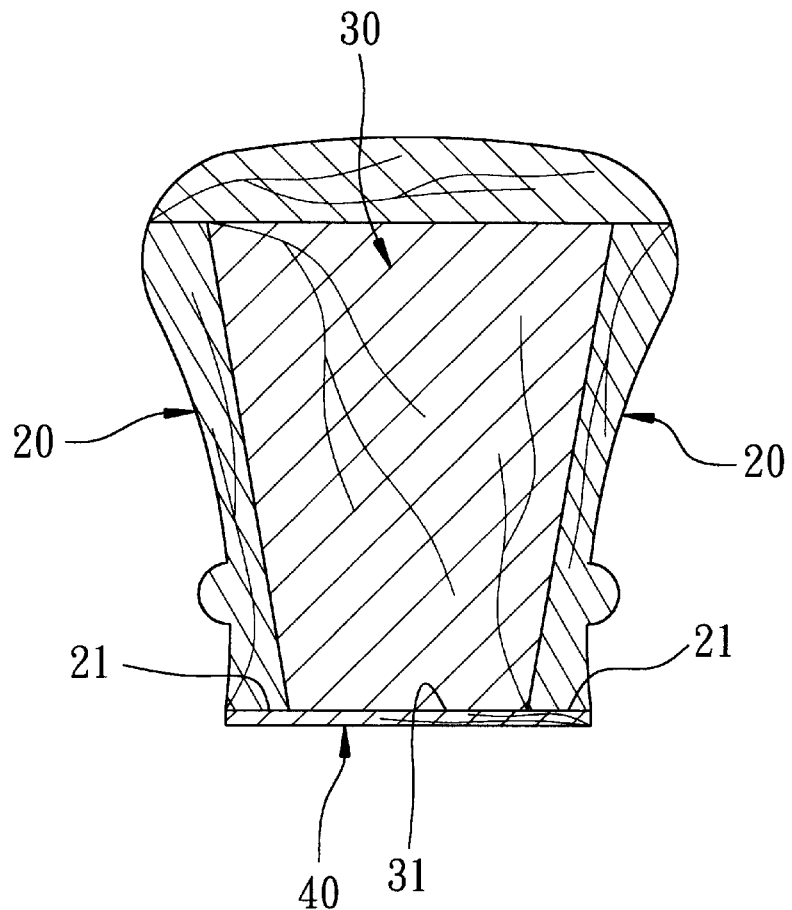
FIG. 6 is a sectional view of the third preferred embodiment of an armrest according to the present invention.

Referring to FIG. 6, the third preferred embodiment of the armrest according to the present invention is shown to be substantially similar to the first preferred embodiment. In this embodiment, the armrest further comprises a lower veneer layer 40 that is made of oakwood, and that is fixedly attached to the lower surface 31 of the armrest body 30 and the bottom end surfaces 21 of the lateral veneer layers 20 by means of an adhesive such that all surfaces of the armrest body 30 are wholly covered by oakwood.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An armrest having a length, a minimum total width, and a maximum total height, said armrest comprising:

an armrest body made of a wood material different from oakwood, said armrest body extending in a longitudinal direction and having a planar lower surface, a planar upper surface opposite to said lower surface, and two opposing planar lateral surfaces that interconnect said lower and upper surfaces;

an upper veneer layer made of oakwood and including a curved top surface, and a planar bottom connecting surface fixedly attached to and covering said upper surface of said armrest body, wherein a ratio of a maximum thickness of said upper veneer layer to said maximum total height of said armrest is at least 0.1; and two lateral veneer layers, each of which is made of oakwood and includes a planar top end surface fixedly attached to said bottom connecting surface of said upper veneer layer, a bottom end surface opposite to said top end surface, a planar inner lateral surface fixedly attached to and covering a respective one of said lateral surfaces of said armrest body, and a curved outer lateral surface, which is opposite to said inner lateral surface and which is formed with a protruding rib that extends in the longitudinal direction, a planar surface section that extends from said bottom end surface to a lower edge of said rib, and a curved surface section that extends from an upper edge of said rib to said top end surface, wherein a ratio of a minimum thickness of each of said lateral veneer layers to said minimum total width of said armrest is at least 0.1.

2. The armrest as claimed in claim 1, wherein said upper surface of said armrest body is wider than said lower surface of said armrest body.

3. The armrest as claimed in claim 1, wherein width of said upper surface of said armrest body is equal to that of said lower surface of said armrest body.

4. The armrest as claimed in claim 1, further comprising a lower veneer layer made of oakwood and fixedly attached to said lower surface of said armrest body and said bottom end surfaces of said lateral veneer layers.

5. The armrest as claimed in claim 1, wherein said maximum total height of said armrest is at least 2¼ inches, and said minimum total width of said armrest is at least 1½ inches.

* * * * *